Patented Apr. 28, 1925.

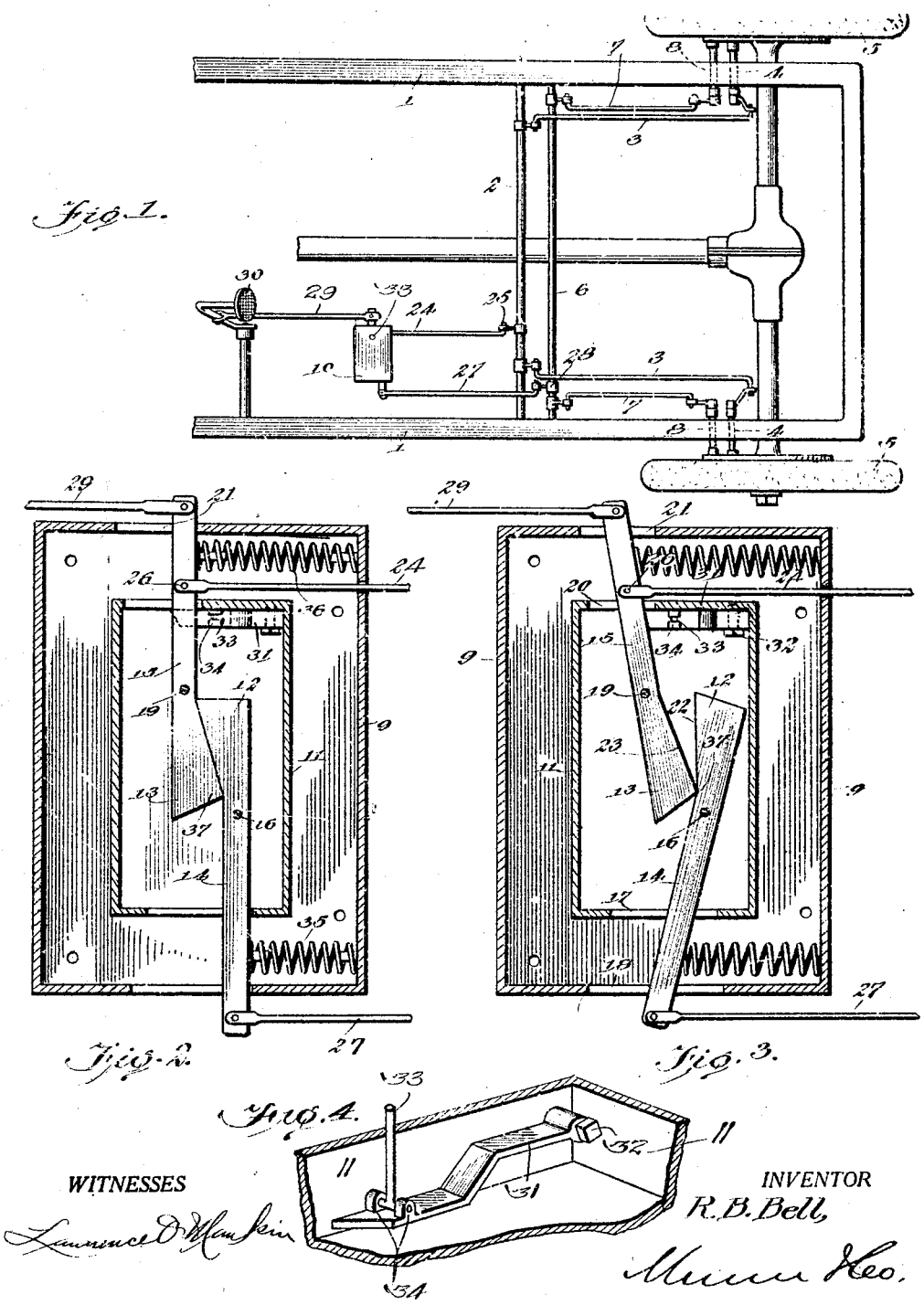

1,535,092

UNITED STATES PATENT OFFICE.

ROBERT BENJAMIN BELL, OF MIAMI, FLORIDA.

BRAKE.

Application filed March 31, 1924. Serial No. 703,215.

*To all whom it may concern:*

Be it known that I, ROBERT B. BELL, a citizen of the United States, and a resident of Miami, in the county of Dade and State of Florida, have invented certain new and useful Improvements in Brakes, of which the following is a specification.

This invention relates to an apparatus for controlling the braking elements for automobiles and has for its object the provision of a device which will coordinate the emergency brake with the service brake in such a manner that the service brake will be effectively advanced into action before the emergency brake with the last named brake coming immediately thereafter into operative position by the depressing of a common pedal which controls both brakes.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a fragmentary plan view of the chassis of an automobile showing my invention applied to the emergency and service brakes.

Figure 2 is a horizontal section of a casing showing the common control for the emergency brake and service brake in a neutral position.

Figure 3 is a similar horizontal section of the casing showing the common control for the emergency and service brakes in an operative position.

Figure 4 is a fragmentary view in perspective of the locking means for the control.

Referring more particularly to the drawings, 1 designates the channel beams of the frame in which are rotatably mounted a rock shaft 2 for reciprocating links 3 to rock the shafts 4 controlling the emergency expanding brakes of the rear wheels 5.

A rock shaft 6 reciprocates links 7 for rocking shaft 8 that control the service contracting brakes of the rear wheels. The elements just defined are all well known in certain types of automobiles and form no part of the present invention.

The device about to be described may be applied to other forms of mechanism for actuating the service and emergency brakes without affecting the scope of the invention.

A casing 9 is secured in a convenient place as by bolts to the floor of the body of the automobile and is provided with a closure 10 to prevent the loss of oil from the oil pan 11 in which are mounted the interengaging ends 12 and 13 of respective oscillating levers 14 and 15. Lever 14 is pivoted on a pin 16 in the pan and operates through slots 17 and 18 respectively in the pan 11 and casing 9 while lever 15 pivoted on a pin 19 operates through slots 20 and 21 respectively in said pan and casing.

The inner end 12 of lever 14 is enlarged and has an angular side edge 22 in engagement with a similar angular edge 23 of the enlarged end 13 of lever 15 when the service and emergency brakes are in neutral position.

The outer end of lever 14 is connected by a link 27 to a rock lever 28 mounted on the shaft 6 while lever 15 is connected at a point 26 intermediate its pivot 19 and the outer end by a link 24 to a rock lever 25 on the shaft 2. A link 29 is carried forwardly to a pedal 30 which is located adjacent the clutch and accelerator pedals.

A gravity or spring pressed latch 31 riding normally on top of the lever 15 and pivoted at 32 to the side wall of the pan 11 is adapted to engage one edge of the lever 15 and lock said lever in an operative position.

A vertically disposed rod 33 is pivoted to ears 34 on the latch 31 and when raised is adapted to release the latch from its locking position with the lever 15. The end of the rod is located adjacent the seat of the driver so that the same may be conveniently grasped for action.

A spring 35 engaged between lever 14 and a wall of the casing 9 maintains the end 12 of said lever in engagement with the end 13 of lever 15. A spring 36 engaged between said side wall of the casing and the lever 15 cooperates with spring 35 in maintaining lever 15 in neutral position with lever 14.

The operation of my device is as follows:

It will be noted that the length of the arm 14 between its pivot 16 and the outer end is greater than the length of that portion of the arm 15 between its pivot and the point 26 when link 24 is connected to said arm, thus the outer end of arm 14 is operated through a greater arc of the circumference of a circle than the point 26 on arm 15 so that when the pedal 30 is actuated the service brake connected through link 27 to the lever or arm 14 will be thrown into action in advance of the operation of the emergency brake controlled by link 24 and the lever 15. When lever 15 is moved sufficiently latch 31 will fall into place against the side edge of lever 15 and lock said lever and lever 14 in position with both brakes applied. Furthermore it will be appreciated that when lever 15 is actuated through pedal 30 the enlargement 13 will act on the enlargement 12 of lever 14 oscillating lever 14. The abutting point 37 of lever 15 operatively engages the inner end 12 of lever 14 close to its pivot 16 so that a greater leverage is had for oscillating arm 14 than for arm 15.

The brakes are released by a pull on rod 33 when latch 31 is removed from its locking position with lever 15. The springs 35 and 36 return the levers 14 and 15 and the respective service and emergency brakes to neutral normal position. Through the application of both brakes by a single foot pedal the vehicle is brought to a standstill in times of danger and consequent excitement and when the use of the emergency brake is most desired but frequently forgotten. It also has the advantage of eliminating the emergency brake lever from the limited space adjacent the driver's seat, thus affording more room and less inconvenience to the occupants of the front seat.

What I claim is:

1. A device for coordinating the emergency and service brakes for united action and comprising a pair of levers pivoted intermediate their ends and having their inner adjacent ends in engagement, a link connected to the outer end of one lever and having connections with the service brake, a link connected to the other lever intermediate its ends and having connections with the emergency brake and a pedal connected with the outer end of the second mentioned lever.

2. A device for coordinating the emergency and service brakes for united action and comprising a pair of levers pivoted intermediate their ends and having their inner adjacent ends in engagement, a link connected to the outer end of one lever and having connections with the service brake, a link connected to the other lever intermediate its ends and having connections with the emergency brake and a pedal connected with the outer end of the second mentioned lever, springs for maintaining the levers in neutral interengaged relation.

3. A device for coordinating the emergency and service brakes for united action and comprising a pair of levers pivoted intermediate their ends and having their inner adjacent ends in engagement, a link connected to the outer end of one lever and having connections with the service brake, a link connected to the other lever intermediate its ends and having connections with the emergency brake and a pedal connected with the outer end of the second mentioned lever, and a latch for locking the levers in operative relation when the pedal is actuated.

4. A device for coordinating the emergency and service brakes for united action and comprising a pair of levers pivoted intermediate their ends and having their inner adjacent ends in engagement, a link connected to the outer end of one lever and having connections with the service brake, a link connected to the other lever intermediate its ends and having connections with the emergency brake, a pedal connected with the outer end of the second mentioned lever, a latch for locking the levers in operative relation when the pedal is actuated, and means for releasing the latch.

5. A device for coordinating the emergency and service brakes for united action and comprising a pair of levers pivoted intermediate their ends and having their inner adjacent ends in engagement, a link connected to the outer end of one lever and having connections with the service brake, a link connected to the other lever intermediate its ends and having connections with the emergency brake, a pedal connected with the outer end of the second mentioned lever, springs for maintaining the levers in neutral interengaged relation, and a latch for locking the levers in operative relation when the pedal is actuated.

6. A device for coordinating the emergency and service brakes for united action and comprising a pair of levers pivoted intermediate their ends and having their inner adjacent ends in engagement, a link connected to the outer end of one lever and having connections with the service brake, a link connected to the other lever intermediate its ends and having connections with the emergency brake, a pedal connected with the outer end of the second mentioned lever, springs for maintaining the levers in neutral interengaged relation, and a latch for locking the levers in operative relation when the pedal is actuated, and means for releasing the latch to permit the springs to return the levers and brakes to neutral position.

7. The combination of an emergency brake, service brake and a device for coordinating the emergency and service brakes for united action, said device comprising a pedal, means connecting the pedal with the service and emergency brakes, said means including means for causing the service brake to be actuated in advance of the emergency brake.

8. The combination of an emergency brake, service brake and a device for coordinating the emergency and service brakes for united action, said device comprising a pedal, means connecting the pedal with the service and emergency brakes, said means including means for causing the service brake to be actuated in advance of the emergency brake, and means for locking the first mentioned means in position when the brakes have been set.

9. The combination of an emergency brake, service brake and a device for coordinating the emergency and service brakes for united action, said device comprising a pedal, means connecting the pedal with the service and emergency brakes, said means including means for causing the service brake to be actuated in advance of the emergency brake, means for locking the first mentioned means in position when the brakes have been set, and means for releasing the last mentioned means.

ROBERT BENJAMIN BELL.